(12) United States Patent
Kicher et al.

(10) Patent No.: US 6,711,951 B2
(45) Date of Patent: Mar. 30, 2004

(54) ACCELERATION MEASUREMENT SYSTEM AND METHOD

(75) Inventors: Thomas P. Kicher, Willoughby Hills, OH (US); Paul T. Kicher, Wickliffe, OH (US)

(73) Assignee: Kicher & Co., Willoughby Hills, OH (US)

( * ) Notice: Subject to any disclaimer, the term of this patent is extended or adjusted under 35 U.S.C. 154(b) by 0 days.

(21) Appl. No.: 10/394,528

(22) Filed: Mar. 21, 2003

(65) Prior Publication Data
US 2003/0177829 A1 Sep. 25, 2003

Related U.S. Application Data

(60) Provisional application No. 60/366,823, filed on Mar. 22, 2002.

(51) Int. Cl.[7] .................................................. G01P 1/02
(52) U.S. Cl. ........................................................ 73/493
(58) Field of Search ........................................... 73/493

(56) References Cited

U.S. PATENT DOCUMENTS

| | | |
|---|---|---|
| 3,828,294 A | 8/1974 | Baba et al. |
| 4,226,120 A | 10/1980 | Nissl |
| 4,298,777 A | 11/1981 | Bryant |
| 5,548,999 A * | 8/1996 | Kakizaki et al. .............. 73/493 |
| 5,633,461 A * | 5/1997 | Kakizaki et al. .............. 73/493 |
| 5,668,316 A | 9/1997 | Iwai et al. |
| 5,856,620 A | 1/1999 | Okada |
| 6,247,364 B1 | 6/2001 | Kicher et al. |

FOREIGN PATENT DOCUMENTS

| | | |
|---|---|---|
| GB | 2130373 | 5/1984 |
| WO | 02/103367 | 12/2002 |

* cited by examiner

Primary Examiner—Richard A. Moller
(74) Attorney, Agent, or Firm—Renner, Otto, Boisselle & Sklar, LLP

(57) ABSTRACT

An acceleration measurement system for measuring acceleration of a target object includes an accelerometer mount that includes at least one mass, at least one elastic member, and at least one damping material. A method of measuring acceleration of a target object includes selecting the at least one elastic member and the damping material provide a more accurate transmission from the target object to an accelerometer that is connected to the accelerometer mount.

40 Claims, 5 Drawing Sheets

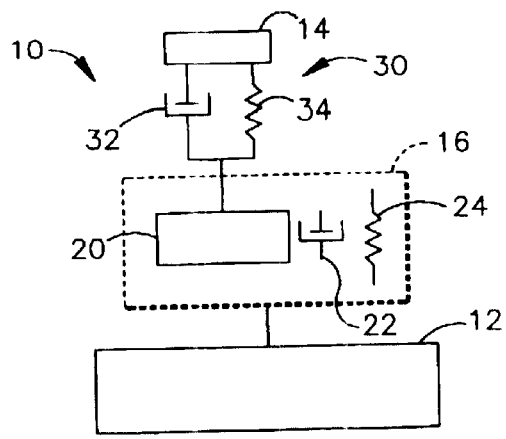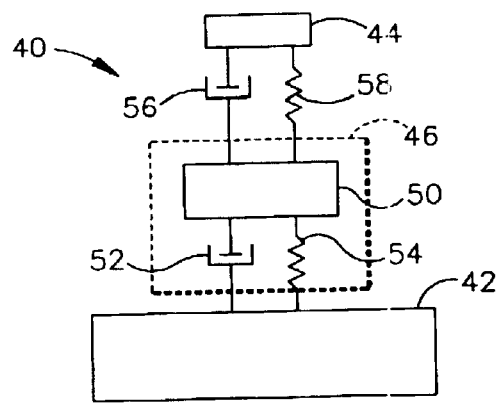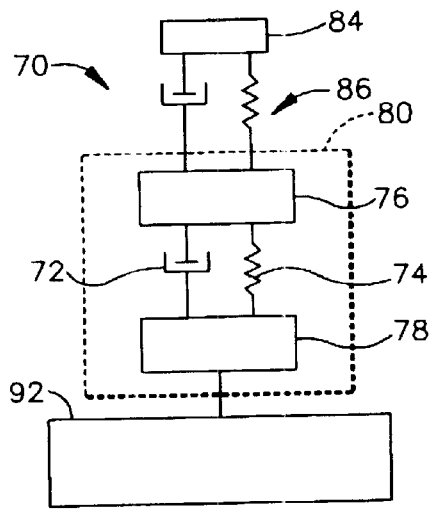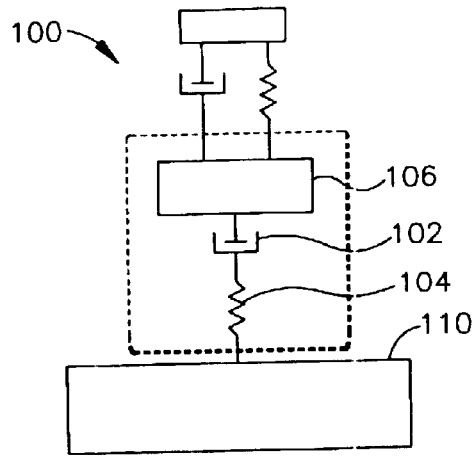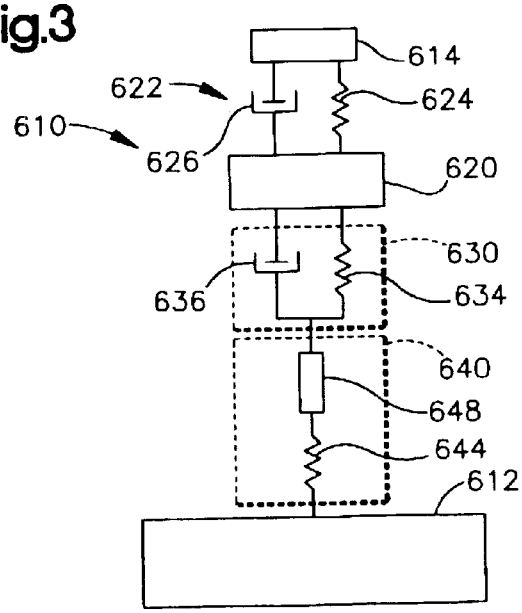

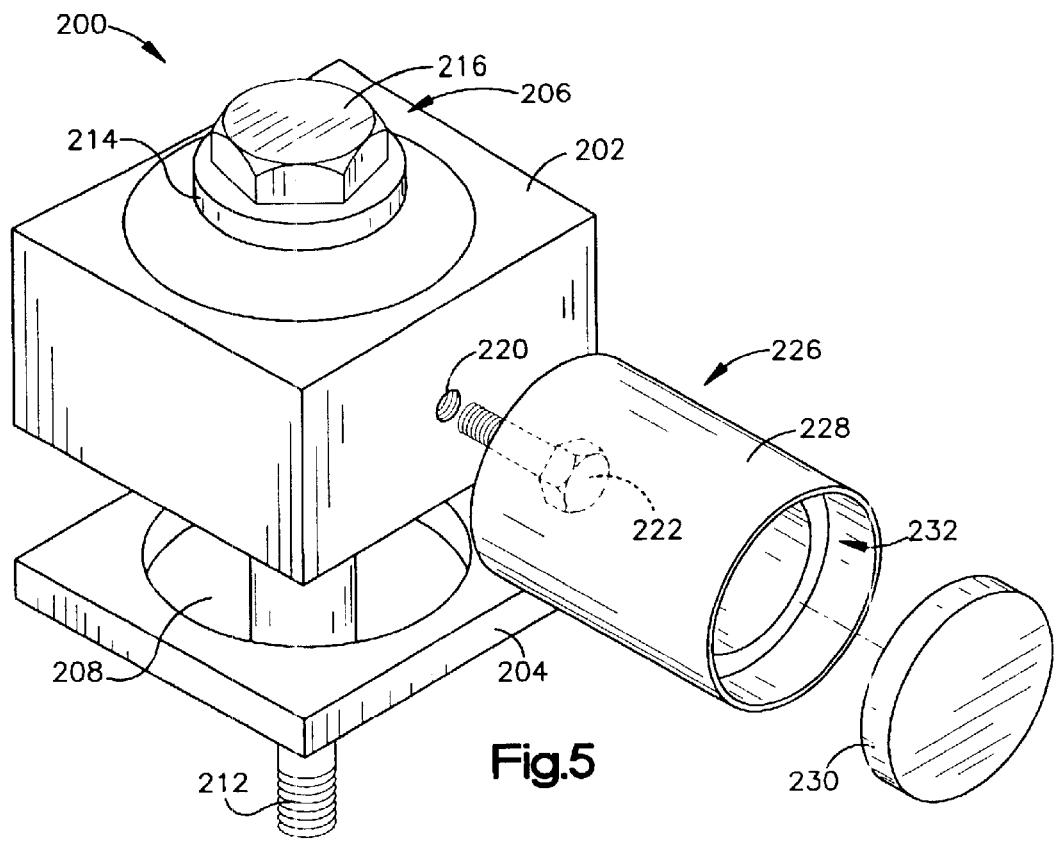
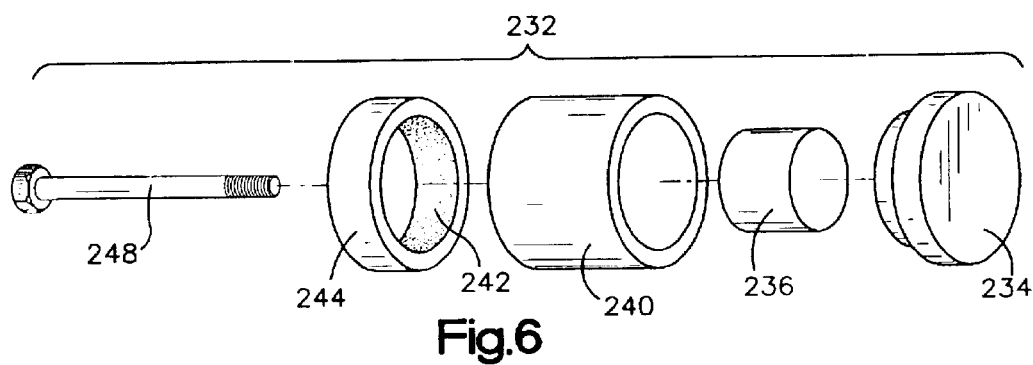
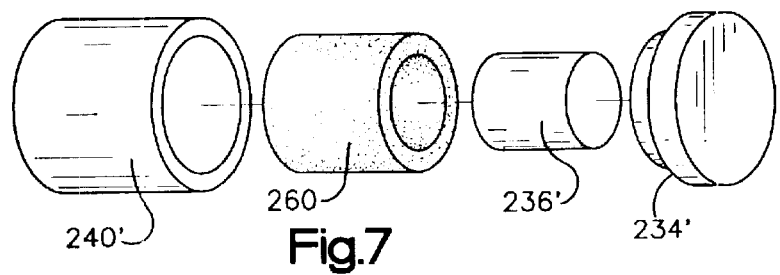

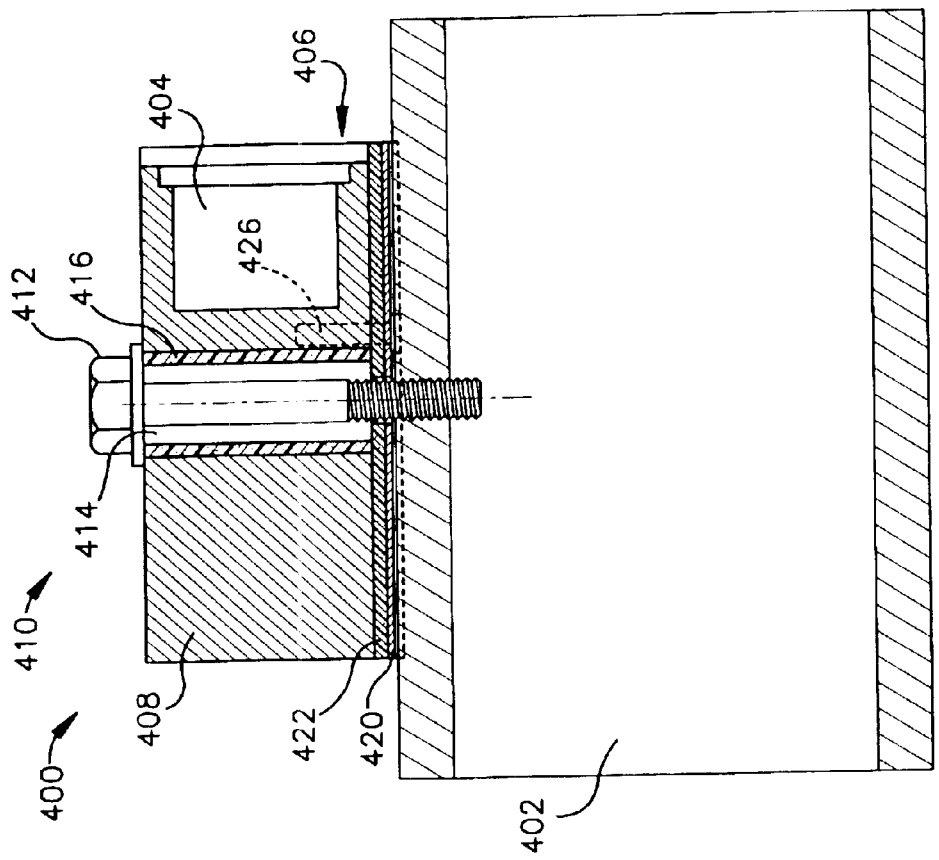
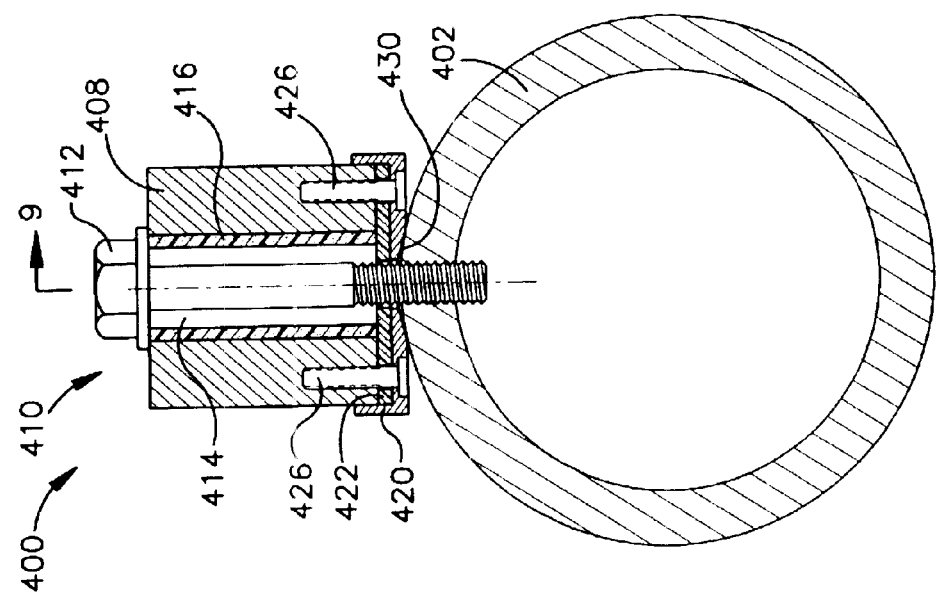

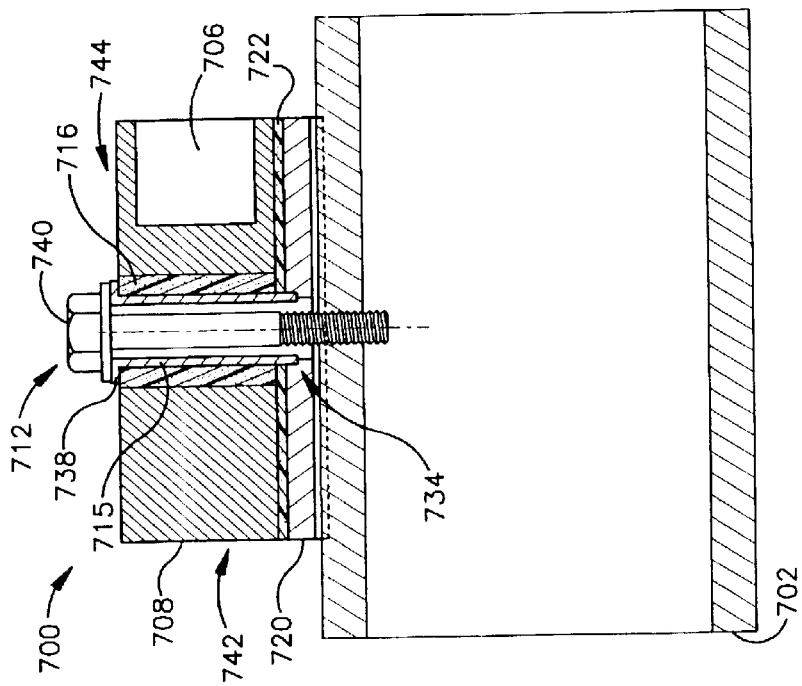
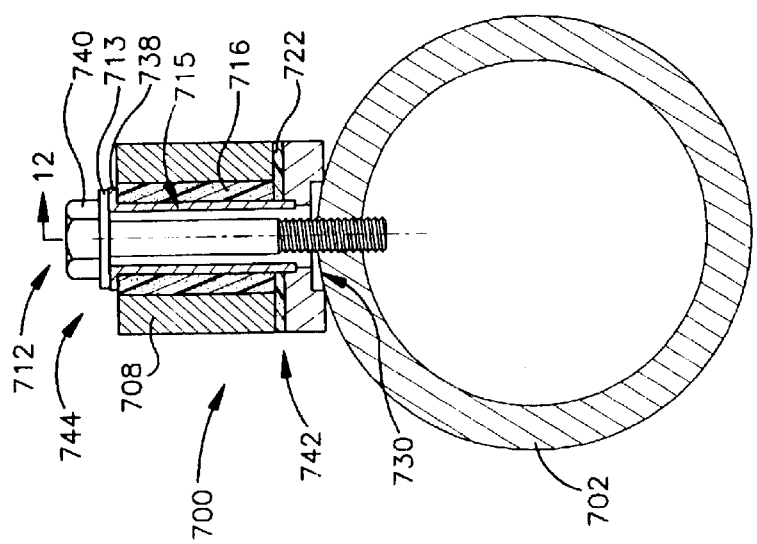
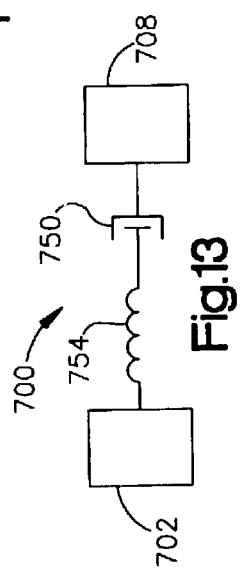

ACCELERATION MEASUREMENT SYSTEM AND METHOD

This application claims the benefit of U.S. Provisional Application No. 60/366,823, filed Mar. 22, 2002, which is hereby incorporated by reference in its entirety.

TECHNICAL FIELD

The invention is generally related to acceleration measurement systems and methods for measuring acceleration.

BACKGROUND OF THE RELATED ART

It is known to attach accelerometers to objects to evaluate forces applied as part of operations such as impact loading. It is useful to measure accelerations in target objects as piles, for example, to avoid overloading. Mounting blocks for attaching accelerometers to target objects have tended to be rigid masses, which may not be optimum connections for accurately transmitting accelerations of the target object to the accelerometer.

SUMMARY OF THE INVENTION

An acceleration measurement system for measuring acceleration of a target object includes an accelerometer mount that includes at least one elastic member, one mass, and a damping material. A method of measuring acceleration of a target object includes selecting the at least one elastic member and the damping material and the mass to provide a more accurate transmission from the target object to an accelerometer that is connected to the accelerometer mount.

According to an aspect of the invention, an acceleration measurement system for measuring acceleration of a target object, includes: an accelerometer mount configured to be mounted on the target object, and an accelerometer connected to the accelerometer mount. The accelerometer mount includes a damping material, at least one mass, and at least one elastic member.

According to another aspect of the invention, a method of measuring acceleration of a target object includes the steps of: selecting at least one elastic member and a damping material for inclusion in an accelerometer mount; coupling an accelerometer to the accelerometer mount and the accelerometer mount to the target object; and using the accelerometer to measure the acceleration of the target object.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 1 is a schematic diagram of the generalized structure of an acceleration measurement system in accordance with the present invention;

FIG. 2 is a schematic diagram of a first embodiment of an acceleration measurement system in accordance with the present invention;

FIG. 3 is a schematic diagram of a second embodiment of an acceleration measurement system in accordance with the present invention;

FIG. 4 is a schematic diagram of a third embodiment of an acceleration measurement system in accordance with the present invention;

FIG. 5 is an exploded view of a particular embodiment of an acceleration measurement system in accordance with the present invention;

FIG. 6 is an exploded view of the accelerometer assembly of the acceleration measurement system of FIG. 5;

FIG. 7 is an exploded view of an alternative embodiment accelerometer assembly for use with the acceleration measurement system of FIG. 5;

FIG. 8 is an end cross-sectional view of a second particular embodiment of an acceleration measurement system in accordance with the present invention;

FIG. 9 is a side sectional view along section 9—9 of FIG. 8;

FIG. 10 is a schematic diagram of a fourth embodiment of an acceleration system according to the present invention;

FIG. 11 is an end cross-sectional view of a third particular embodiment of an acceleration measurement system in accordance with the present invention;

FIG. 12 is a side cross-sectional view of the system of FIG. 11;

FIG. 13 is a functional diagram of the system of FIGS. 11 and 12;

DETAILED DESCRIPTION

Figure 15:
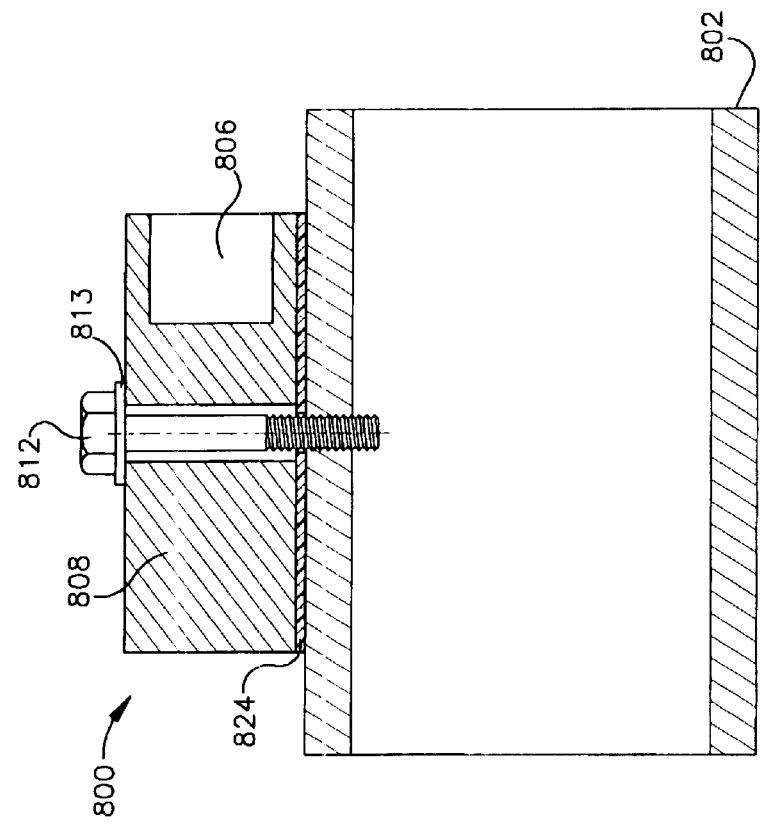
FIG. 15 is a side cross-sectional view of the system of FIG. 14.

An acceleration measurement system for measuring acceleration of a target object includes an accelerometer and an accelerometer mount for mounting the accelerometer to the target object. The accelerometer mount includes at least one mass, one damping material and at least one elastic member. The mass, damping material and elastic member may be selected to have accelerations measured by the accelerometer correspond to and/or closely parallel the accelerations of the target object. The elastic member may be at any of a variety of locations, such as between various portions of the accelerometer mount mass, or at a connection between the accelerometer mount mass and the target object. The elastic member may be any of a variety of types of couplings between parts, such as fasteners, weldments, or adhesive connections. Likewise, the damping material may be any of a variety of materials which deform or change shape while dissipating energy. Examples include flexible solids and liquids of various sorts. The same material may exhibit both damping and elastic properties.

The presence of both the damping material and elastic member in the accelerometer mount allows increased accuracy in acceleration measurements, in that the acceleration transmitted to the accelerometer is a closer reflection to the actual acceleration of the target object. This is particularly true if the acceleration measurement system is tuned, that is, if the mass, the damping material and the elastic member of the accelerometer mount are selected in conjunction with the characteristics of the accelerometer, to produce an accurate signal in the accelerometer that more closely parallels the accelerations of the target object.

Referring now to FIG. 1, a schematic diagram of an acceleration measurement system 10 is shown. The acceleration measurement system 10 is a system for measuring acceleration of a target object 12. The acceleration measurement system 10 includes an accelerometer 14 and an accelerometer mount 16. The accelerometer mount 16 is configured to be mounted on the target object 12, and includes a mounting block or mass 20, a damping material 22, and an elastic member 24. The accelerometer 14 is coupled to the mounting block 20. As will be described in greater detail below, the accelerometer mount 16 may have its components arrayed in any of a variety of suitable configurations. In addition, the various components of the accelerometer mount 16 may include a variety of different types of devices. For example, the elastic member 24 may include one or more fasteners, such as screws, bolts, rivets, pins, or the like. Alternatively, the elastic member 24 may include other types of couplings between parts, such as weldments or adhesive materials. The elastic member 24 may be a coupling between various parts of the accelerometer mount 16. Alternatively, the elastic member 24 may be a coupling between the accelerometer mount 16 and the target object 12.

It will be appreciated that fasteners with very high frequency response or stiffness may be considered rigid, such that they do not impart any elastic behavior detectable by the accelerometer.

The damping material 22 may be broadly defined as a solid or liquid material which dissipates substantial amounts of energy when it deforms. The damping material 22 may be a flexible, deformable solid. Alternatively, the damping material 22 may be or may include a liquid, such as a viscous liquid. The damping liquid material 22 may be placed between various parts of the accelerometer mounting 16. Alternatively, the damping material 22 may be placed between the accelerometer mount 16 and the target object 12. The damping material 22 and the elastic member 24 may be placed in parallel. Alternatively, the damping material 22 and the elastic member 24 may be in series. As another alternative, the damping material 22 may include more than one material, to provide damping both in series with the elastic member 24 and in parallel with the elastic member 24.

The damping material may be any of a wide variety of materials with suitable damping characteristics. The damping characteristics which are suitable for any situation may depend on many factors, including the size and configuration of the accelerometer measurement system. As one example, the damping material may include butyl rubber. Alternatively, another material with suitable damping characteristics, and with better temperature characteristics than butyl rubber, may be employed.

It will be appreciated that the accelerometer mount 16 may have other components, and/or may have multiple components of the types of components shown in FIG. 1 and described above. For example, the accelerometer mount 16 may have multiple elastic members 24, such as having multiple fasteners connecting the accelerometer mount 16 to the target object 12. Also, it will be appreciated that the damping material 22 and the elastic member 24 may represent different properties of a single material or component, with the elastic member 24 representing a resonating component of the connection, and the damping material 22 representing a damping component of the same connection.

The damping material 22 and the elastic member 24 may be selected such that, in combination with the characteristics of a connection 30 between the accelerometer 14 and the mounting block 16, accelerations of the target object 12 are transmitted with at least some fidelity to the accelerometer 14. In particular, the damping material 22 and the elastic member 24 may be selected as a function of a damping component 32 and an elastic component 34 of the connection, as well as a function of the masses of the accelerometer 14 and the mounting block 20. Such selection is termed "tuning" the system, and may involve analysis, computation, and/or experimentation. The selection of the damping material 22 and the elastic member 24 may involve selection of materials, types of members, as well as various other parameters such as material and member thicknesses, sizes, geometries, locations, and/or configurations. Such a tuning process may be an iterative process, with experimental, analytic, and/or computational results used to make additional selections in an attempt to achieve improved fidelity of the system (improved representation of the target object's accelerations in the accelerometer).

What follows are schematic diagrams of various possible configurations of acceleration measurement systems according to the present invention. Thereafter, exemplary specific examples of acceleration measurement systems are shown and described.

Turning to FIG. 2, an acceleration measurement system 40 includes an accelerometer mount 46 that couples an accelerometer 44 to a target object 42. The accelerometer mount 46 includes a mass or mounting block 50, as well as a damping material 52 and an elastic member 54 between mounting block 50 and the target object 42. The accelerometer 44 includes a damping component 56 and an elastic component 58 in the coupling 60 between the accelerometer 44 and the mounting block 50.

The elastic member 54 may be one or more fasteners connecting the mass or mounting block 50 to the target object 42. For example, the elastic member 54 may be a mounting bolt bolting the mass or mounting block 50 to the target object 42. Alternatively, the elastic member 54 may be another type of fastener or a non-fastener, as described above. Also, it will be appreciated that elastic characteristics may be imparted by a damping material.

The damping material 52 may be a layer of damping material between the mass or mounting block 50 and the target object 42, for example, with one or more holes to allow the elastic member 52 to pass therethrough.

The term "accelerometer," as used herein is broadly defined as a sensor that produces a signal (e.g., electrical, optical, and/or mechanical) in response to an acceleration. For example, an accelerometer may be a mechanical component which deforms in response to an acceleration. Thus, the elastic component 58, the property of the accelerometer 44 that tends to move or flex without losing energy, may represent the portion that tends to resonate, and the damping component 56 may represent the property of the connection between the accelerometer 44 and the mounting block 50 that tends to damp motion of the accelerometer 44. The damping component 56 of the coupling 60 may be a damping material in contact with or otherwise damping motion of the accelerometer 44. An example of an accelerometer with damping material is described in Patent Cooperation Treaty Application No. PCT/US01/16485, which is incorporated herein by reference in its entirety. It will be appreciated that the other components, such as a housing, may be coupled to the accelerometer 44, perhaps being part of the coupling 60.

The components may facilitate coupling of the accelerometer 44 to the mounting block 50. For example, the mounting block 50 may have an internally-threaded recess for receiving the accelerometer 44. Alternatively, the accelerometer 44 may be coupled to a mounting device such as a cylinder, and bolted or otherwise fastened to the mounting block 50.

Similarly to the other acceleration measurement systems described herein, the elastic member 54 and the damping material 52 may be selected such that, in conjunction with the elastic component 58 and the damping component 56 of the connection 60 between the accelerometer 44 and the mounting block 50, accelerations of the target object 42 are accurately portrayed within the accelerometer 44. That is, selection of the damping material 52 and the elastic member 54 may be made to increase the accuracy of the acceleration measurement system 40. For example, the damping material 52 may be varied in terms of material properties, material thickness, location, or in other ways. The elastic member 54 may be varied by changing the type, location, and/or stiffness of fasteners between the mounting block 50 and the target object 42, for example.

Another configuration is shown in FIG. 3, wherein an acceleration measurement system 70 includes a damping material 72 and an elastic member 74 which are between a mounting block 76 and a mounting shoe 78. The damping material 72, the elastic member 74, the mounting block 76, and the shoe 78, are all components of an accelerometer mount 80. An accelerometer 84 is coupled to the mounting block 76 via a coupling 86. The coupling 86 may include an elastic component and a damping component, as was explained above with regard to the acceleration measurement system 40.

The connection between the accelerometer 84 and the mounting block 76 may be similar to the connection described above between the accelerometer 44 and the mounting block 50. The shoe 78 may be configured to interface with a target object 92. Thus, a face of the shoe may have a shape configured to interface with the target object 92. For example, the target object 92 may be a round bar or pile, and the shoe 78 may have a V-shaped recess therein to facilitate engagement with the bar. The coupling of the shoe 78 to the mounting block 76 may be made by fasteners which constitute the elastic member 74. The damping material 72 may be enclosed in the coupling between the mounting block 76 and the shoe 78, for example, the mounting block 76 may be placed in a corresponding slot in the shoe 78, with the damping material 72 between the mounting block 76 and the shoe 78. Thus, the damping material 72 may be partially or fully enclosed, protecting the damping material 72 from environmental exposure which may contaminate it. Also, the damping material 72 may be sticky or tacky, and for that reason it may be desirable to enclose the damping material 72.

Turning now to FIG. 4, an acceleration measurement system 100 is shown. The acceleration measurement system 100 includes a damping material 102 and an elastic member 104 that are connected in series between a mounting block 106 and a target object 110. For example, the mounting block 106 may have a hole therethrough which is lined with the damping material 102, with a fastener passing through the hole and being used to couple the mounting block 106 to the target object 110. In addition, a second elastic member or damping material may be placed in parallel with the damping material 102 and the elastic member 104, as part of the coupling between the mounting block 106 and the target object 110.

It will be appreciated that the general description in FIGS. 2–4 are only simple examples of the variety of suitable configurations that are possible. For example, each of the elastic members described above may represent multiple fasteners. Various types of fasteners and the damping material may be varied in size, shape, thickness, and/or material type in order to vary the damping properties of the material. It will further be appreciated that a method of measuring acceleration may include selecting damping material and elastic members of an accelerometer mount in order to facilitate the acceleration perceived by the accelerometer accurately corresponding to the acceleration of a target object.

The selection of the elastic member and the damping material as part of the accelerometer mount may be an iterative process involving an initial selection, followed by testing of a sample, and changing the elastic member and the damping material until a desired accuracy of result is obtained. In such iterative testing a known acceleration may be applied to the target object. Certain guidelines may be applied in modifying the elastic member and damping material in order to obtain a more accurate result. For example, certain readings in the accelerometer in response to a known acceleration of the target object may indicate a need for a greater or lesser amount of damping in the connection between the accelerometer mount and the target object. An adjustment in the amount of damping may be made by changing the amount, the configuration, and/or the type of damping material.

Alternatively or in addition, the process of selecting the elastic member and the damping material of the accelerometer mount may include analytical techniques which may correspond to techniques utilized in reducing vibration. In vibration and shock engineering, the typical goal is to suppress vibrations, for example, designing systems to reduce or eliminate propagation and/or growth of vibration. In contrast, the goal in configuring an accelerometer mount is to accurately transmit acceleration, such that accelerations in the target object are accurately transmitted through the accelerometer mount to an accelerometer, with perhaps a phase shift between the acceleration and the accelerometer response. Thus, the goal in configuring an acceleration system is to dissipate as quickly as practicable oscillations that appear in the accelerometer as a result of the acceleration of the target object. However, it will be understood that models used in vibration engineering may be utilized in configuring the accelerometer mount.

What follows now are some specific embodiments of accelerometer measurement systems and parts for such systems, according to the present invention. It will be appreciated that the systems and parts described below are only a few of the wide variety of accelerometer measurement system configurations which may be employed.

FIG. 5 shows an accelerometer measurement system configured to be mounted onto a target object (not shown). The acceleration measurement system 200 includes a mounting block 202. A layer of damping material 204 is pressed on one side against the mounting block 202. A mounting bolt 206 passes through a hole in the mounting block 202 and a corresponding hole 208 in the layer of damping material 204. The mounting bolt 206 is configured to attach the mounting block 202 to the target object, with the layer of damping material 204 between the mounting block 202 and the target object. The mounting bolt 206 has a threaded end 212 configured to be received in a corresponding threaded hole in the target object. A washer 214 may be placed between the mounting block 202 and a head 216 of the mounting block 206.

The mounting block 202 has an internally-threaded hole 220. The threaded hole 220 receives an accelerometer mounting bolt 222, which in turn secures an accelerometer housing 226 to the mounting block 202. The accelerometer housing 226 includes a cylindrical container 228 and a cover 230. Within the accelerometer housing is an accelerometer assembly 232. The cylindrical container 228 and the cover 230 protect the accelerometer assembly 232 from damage due to physical impacts and ingress of dirt, grease, or other impurities.

Details of the accelerometer assembly 232 are shown in FIG. 6. The accelerometer assembly 232 includes an accelerometer diaphragm 234 and an inertial mass 236 (collectively the accelerometer) as well as an internal housing 240, an internal damper 242, an end housing 244, and an assembly screw 248. The accelerometer diaphragm 234 may have measurement devices such as strain gauges thereupon. The internal damper 242 is pinched between the housing 240 and the end housing 244. The accelerometer diaphragm 234 is welded to the internal housing 240. The assembly screw 248 secures together the end housing 244, the internal housing 240, the inertial mass 236, and the accelerometer diaphragm 234. The mass of the accelerometer diaphragm 234 itself, as well as the mass of the inertia mass 236, operate to bend the accelerometer diaphragm 234 as a function of acceleration. This bending or straining of the accelerometer diaphragm 234 is detected by the measurement devices, such as the strain gauges, generating a measurable electrical signal. The internal damper 242 functions to damp motion of the accelerometer diaphragm 234. Further details regarding accelerometers of this sort may be found in the previously-mentioned PCT application and in U.S. Pat. No. 6,247,364, which is incorporated herein by reference in its entirety.

FIG. 7 shows an alternate configuration for part of the accelerometer assembly. In the alternate configuration an annular sleeve of damping material 260 is bonded between an internal housing 240', and an inertial mass 236' that is in contact with an accelerometer diaphragm 234'.

From the above discussion regarding embodiments shown in FIG. 1–4, it will be appreciated that the mounting bolt 206 functions as an elastic member, and that the layer of damping material 204 functions as a damper, in the connection between the mounting block 202 and the target object. The mounting bolt 206 and the layer of damping material 204 may be selected, in conjunction with the layout of the accelerometer, such that accelerations are accurately transmitted between the target object and the accelerometer diaphragm 234. In particular, the damping material 204 and the mounting bolt 206 may be selected in conjunction with the configuration of the accelerometer assembly 232, and the characteristics of the internal damper 242, the inertial mass 236, and the accelerometer diaphragm 234.

Turning now to FIGS. 8 and 9, an acceleration measurement system 400 is shown for measuring acceleration in a target object, such as a pile or a Hopkinson bar 402. The acceleration measurement system includes an accelerometer 404 that is installed in a corresponding recess 406 in a mounting block 408. The mounting block 408 is part of an accelerometer mount 410, which also includes a bolt 412, an attachment post 414, a damping material cylinder 416 about the attachment post 414, a shoe 420, a layer of damping material 422 between the shoe 420 and the mounting block 408, and a pair of fasteners 426. The fasteners 426 hold the shoe 420 to the mounting block 408 with the layer of damping material 422 therebetween. The shoe 420 includes a surface 430 that is shaped to securely engage the pile or bar 402. The bolt 412 holds the shoe 420 securely against the bar 402, such that, for purposes of analysis of the system, the shoe 420 may be considered as part of the bar 402.

The fasteners 426 function as elastic members in the coupling between the mounting block 408 and the bar 402. The bolt 412 may also function as an elastic member in the coupling, although it will be appreciated that the bolt 412 may be sufficiently stiff relative to the fasteners 426 that the elasticity of the mounting bolt 412 may be neglected in the analysis.

Damping in the coupling between the bar 402 and the mounting block 408 may be proved by a combination of the cylindrical damping material 416 and the layer of damping material 422. The fasteners 426 and the damping material 416 and 422 may be selected, as described above, in order to allow accelerations of the pile bar 402 to be faithfully transmitted to the accelerometer 404.

FIG. 10 shows a schematic diagram of a multiple degree of freedom acceleration measurement system 610, of which the particular embodiments of FIGS. 5–9 are specific examples. The acceleration measurement system 610 measures acceleration of a target object 612. The system 610 includes an accelerometer mass 614 coupled to a mounting block mass 620 by a connection 622. The connection 622 includes an elastic component 624 and a damping component 626. The elastic component 624 may be an elastic component of a diaphragm of the accelerometer, for example, and the damping component 626 may be something that damps movement of the accelerometer diaphragm.

An external damping material 630 may be between the mounting block mass 620 and the target object 612. The external damping material 630 may include an elastic component 634 and a damping component 636. Further, a structural member 640 may also be between the mounting block mass 620 and the target object 612, for example in series with the external damping material 630, coupling together the mounting block mass 620 and the target object 612. The structural member 640 may include an elastic component 644 and a structural mass 648. As an example, the structural member 640 may be a fastener such as a bolt, in which case the structural mass 648 may have negligible mass when compared to the mounting block mass 620.

It will be appreciated that the acceleration measurement system 610 has numerous components which affect the fidelity of the accelerometer in measuring acceleration of the target object 612. In tuning the acceleration measurement system 610 to achieve fidelity in acceleration measurements, alterations may be made in the various masses, elastic components, and damping components of the system. Use of multiple-degree-of-freedom systems such as the acceleration measurement system 610 may facilitate "tuning" of the system to achieve fidelity in measurements. It will be appreciated that multiple-degree-of-freedom systems may be configured in other suitable ways, and that alternate configurations may have a greater number of degrees of freedom.

Another embodiment, an acceleration measurement system 700, is shown in FIGS. 11 and 12. The acceleration measurement system 700 may be used for measuring acceleration in a target object, such as a pile or a Hopkinson bar 702. The system 700 has several parts in common with or corresponding to those of the acceleration measurement system 400 shown in FIG. 8 and 9, and described above. Thus the system 700 includes a mounting block 708 with a recess 706 for receiving an accelerometer. The mounting block 708 is part of an accelerometer mount 710, which also includes a bolt 712, a washer 713, a sleeve 715, a damping material cylinder 716 about the sleeve 715, a shoe 720, and a layer of damping material 722 between the shoe 720 and the mounting block 708. The shoe 720 includes a surface 730 that is shaped to engage the pile or bar 702.

The bolt 712 holds the shoe 720 securely against the bar 702, with the sleeve 715 transmitting loads from the bolt 712 and the washer 713, to the shoe 720. The shoe 720 includes an annular recess 734 for receiving the sleeve 715. The sleeve includes an annular ledge 738 at its opposite end, in contact with the washer 713. The ledge 738 prevents contact between the mounting block 708 and both the washer 713 and a bolt head 740 of the bolt 712. The ledge 738 also does not contact the mounting block 708, being in contact with the damping material cylinder 716 instead. Thus there is damping material 742, either the damping material cylinder 716 or the damping material layer 722, between the mounting block 708 and other parts of the acceleration system 700. The bolt 712, the washer 713, the sleeve 715, and the shoe 720, function together as an elastic member 744 coupling the mounting block 708 to the bar or pile 702.

A functional model of the system 700 is shown in FIG. 13, with the damping material 742 (the damping material cylinder 716 and/or the damping material layer 722) represented as a damping element 750, and with the elastic member 744 (the bolt 712, the washer 713, the sleeve 715, and/or the shoe 720) represented as a spring element 754.

Figure 16:
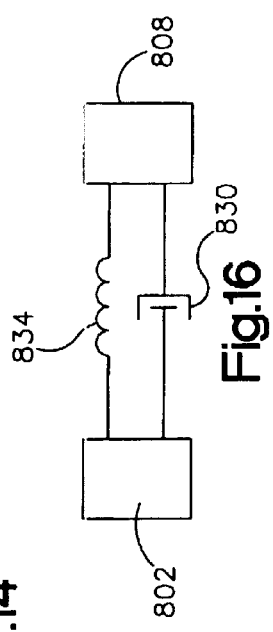
FIG. 16 is a functional diagram of the system of FIGS. 14 and 15.
Figure 14:
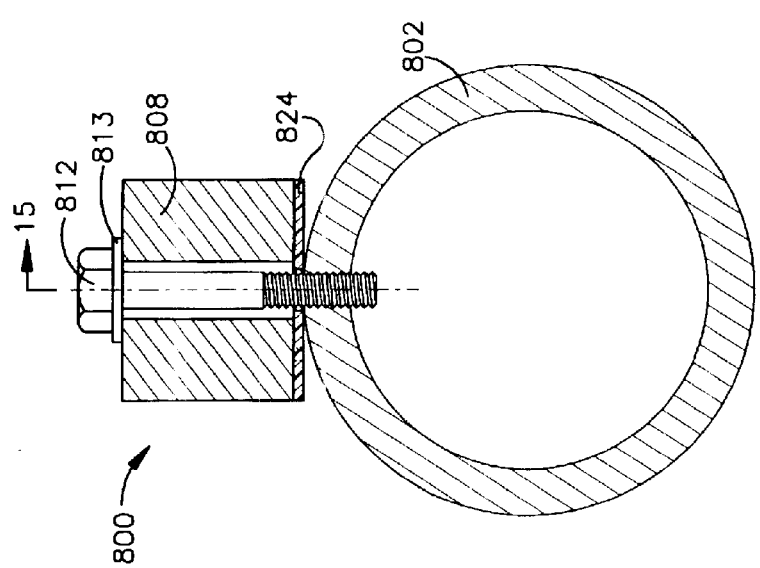
FIG. 14 is an end cross-sectional view of a fourth particular embodiment of an acceleration measurement system in accordance with the present invention.

Yet another embodiment, an acceleration measurement system 800, is shown in FIGS. 14 and 15. The system 800 includes a mounting block 808 with a recess or cavity 806 for receiving an accelerometer; a bolt 812 and a washer 813 for securing the mounting block 808 to a bar or pile 802; and a damping material layer 824 between the mounting block 808 and the bar or pile 802. The system 800 is represented functionally in FIG. 16, with the damping material (the damping material layer 824) represented as a damping element 830, and with the elastic member (the is bolt 812) represented as a spring element 834.

Accelerometer measurement systems such as those described above may be utilized in measuring accelerations of a wide variety of objects. One example is as a side-mounted acceleration measurement system to measure accelerations in a pile.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An acceleration measurement system for measuring acceleration of a target object, the system comprising:
   an accelerometer mount configured to be mounted on the target object, the accelerometer mount including:
   at least one damping material,
   at least one mass, and
   at least one elastic member; and
   an accelerometer connected to the accelerometer mount.

2. The acceleration measurement system of claim 1, wherein the at least one elastic member includes at least one fastener.

3. The acceleration measurement system of claim 2, wherein the at least one fastener includes a system-mount fastener for mounting the system on the target object.

4. The acceleration measurement system of claim 3,
   wherein the accelerometer mount includes a mounting block that the accelerometer is connected to; and
   wherein the at least one damping material includes mount-fastener damping material between the mounting block and the mounting fastener.

5. The acceleration measurement system of claim 1, wherein the at least one elastic member includes a weldment.

6. The acceleration measurement system of claim 5, wherein the weldment is at least part of an attachment between portions of the accelerometer mount.

7. The acceleration measurement system of claim 1, wherein the at least one elastic member includes an adhesive material.

8. The acceleration measurement system of claim 7, wherein the at least one damping material also includes the adhesive material.

9. The acceleration measurement system of claim 7, wherein the adhesive material is at least part of a connection between portions of the accelerometer mount.

10. The acceleration measurement system of claim 1,
    wherein the accelerometer mount further includes:
    a mounting block to which the accelerometer is attached; and
    a shoe coupled to the mounting block; and
    wherein the shoe is configured to interface with the target object.

11. The acceleration measurement system of claim 10, wherein the at least one elastic member includes at least one shoe-mounting fastener that couples the shoe to the mounting block.

12. The acceleration measurement system of claim 11, wherein the at least one shoe-mounting fastener includes at least one threaded fastener.

13. The acceleration measurement system of claim 12, wherein each of the at least one threaded fastener passes through a respective hole in the shoe, and engages internal threads in a respective opening in the accelerometer mount.

14. The acceleration measurement system of claim 11, wherein the at least one damping material includes mount-shoe damping material between the shoe and the accelerometer mount.

15. The acceleration measurement system of claim 11, further comprising a system-mounting fastener for mounting the system on the target object.

16. The acceleration measurement system of claim 10, wherein the at least one damping material includes a damping material layer between the shoe and the mounting block.

17. The acceleration measurement system of claim 16, wherein the at least one elastic member includes a system-mount fastener for mounting the system on the target object.

18. The acceleration measurement system of claim 17,
    wherein the accelerometer mount includes a mounting block that the accelerometer is connected to; and
    wherein the at least one damping material further includes mount-fastener damping material between the mounting block and the mounting fastener.

19. The acceleration measurement system of claim 18,
wherein the accelerometer mount includes a sleeve between the mount-fastener damping material and the mounting fastener.

20. The acceleration measurement system of claim 19, wherein the mounting block is not in direct contact with either the sleeve or the system-mount fastener.

21. The acceleration measurement system of claim 1, wherein the at least one damping material is configured to be between the accelerometer mount and the target object when the accelerometer mount is mounted on the target object.

22. The acceleration measurement system of claim 1, wherein the at least one damping material includes a flexible solid.

23. The acceleration measurement system of claim 1, wherein the at least one damping material includes a liquid.

24. The acceleration measurement system of claim 1, wherein the at least one damping material includes butyl rubber.

25. The acceleration measurement system of claim 1, wherein the accelerometer mount is a multiple degree of freedom system including multiple damping components and multiple elastic components.

26. The acceleration measurement system of claim 1, wherein the accelerometer includes a suspended mass responsive to acceleration, and wherein the accelerometer includes an accelerometer damper that damps motion of the suspended mass.

27. The acceleration measurement system of claim 1, wherein the accelerometer mount includes a mounting block that the accelerometer is connected to.

28. The acceleration measurement system of claim 27, wherein the at least one damping material and the at least one elastic member are coupled in series between the mounting block and the target object.

29. The acceleration measurement system of claim 27, wherein the at least one damping material and the at least one elastic member are coupled in parallel between the mounting block and the target object.

30. The acceleration measurement system of claim 27, wherein the at least one elastic member includes a system-mount fastener for mounting the system on the target object.

31. The acceleration measurement system of claim 30, wherein the at least one damping material includes a damping material layer a side of the mounting block.

32. The acceleration measurement system of claim 31, wherein the damping material layer is configured to press against the target object when the system is mounted to the target object.

33. A method of measuring acceleration of a target object, the method comprising:
selecting at least one elastic member and at least one damping material for inclusion in an accelerometer mount;
coupling an accelerometer to the accelerometer mount and the accelerometer mount to the target object; and
using the accelerometer to measure the acceleration of the target object.

34. The method of claim 33, wherein the selecting includes selecting the at least one elastic member and the at least one damping material to minimize differences between the acceleration of the target object and acceleration of the accelerometer.

35. The method of claim 33, wherein the selecting includes iteratively tentatively choosing the at least one elastic member and the at least one damping material, and examining the effect of the tentative choosing on the response of the accelerometer to accelerations of the test object.

36. The method of claim 35, wherein the examining the effect of the tentative choosing includes experimentally examining the effect of the tentative choosing.

37. The method of claim 35, wherein the examining the effect of the tentative choosing includes analytically examining the effect of the tentative choosing.

38. The method of claim 35, wherein the selecting includes selecting a thickness of the at least one damping material.

39. The method of claim 35, wherein the selecting includes selecting the at least one elastic member and the at least one damping material as part of a coupling between the accelerometer mount and the target object.

40. The method of claim 35, wherein the selecting includes selecting the at least one elastic member and the at least one damping material as part of a coupling between parts of the accelerometer mount.

* * * * *